United States Patent [19]

Matsui

[11] Patent Number: 5,392,271
[45] Date of Patent: Feb. 21, 1995

[54] CONCURRENT RECORDING AND REPRODUCING OPTICAL DISC AND OPTICAL HEAD APPARATUS FOR THE SAME

[75] Inventor: Tsutomu Matsui, Tokyo, Japan

[73] Assignee: NEC Corporation, Tokyo, Japan

[21] Appl. No.: 83,665

[22] Filed: Jun. 28, 1993

[30] Foreign Application Priority Data

Jun. 26, 1992 [JP] Japan .................. 4-168091

[51] Int. Cl.6 .............................................. G11B 13/04
[52] U.S. Cl. ........................................ 369/93; 369/15; 369/120
[58] Field of Search ............... 369/275.2, 120, 14, 369/15, 93, 94

[56] References Cited

U.S. PATENT DOCUMENTS

| | | | |
|---|---|---|---|
| 5,031,162 | 7/1991 | Morimoto et al. | 369/13 |
| 5,150,339 | 9/1992 | Ueda et al. | 369/32 |
| 5,166,913 | 11/1992 | Ichiyama | 369/13 |
| 5,173,886 | 12/1992 | Satoh et al. | 369/32 |
| 5,241,531 | 8/1993 | Ohno et al. | 369/275.2 |
| 5,287,335 | 2/1994 | Ichiyama | 369/13 |

*Primary Examiner*—Paul M. Dzierzynski
*Assistant Examiner*—David Vernon Bruce
*Attorney, Agent, or Firm*—Ostrolenk, Faber, Gerb & Soffen

[57] ABSTRACT

A concurrent recording and reproducing optical disc has a magneto-optical medium film coated on a ROM disc having rows of pits. The magneto-optical film is arranged by a predetermined interval between the two adjacent rows of the pit rows. The predetermined interval is determined by a dark Airy disc circle band of a beam spot obtained by focusing a light beam on the concurrent recording and reproducing optical disc. Preferably, two light beams are focused on the optical disc to provide first and second beam spots. The first beam spot is focused on one of the pit rows, and the second beam spot is focused on an area between two selected pit rows.

3 Claims, 3 Drawing Sheets

CONCURRENT RECORDING AND REPRODUCING OPTICAL DISC AND OPTICAL HEAD APPARATUS FOR THE SAME

FIELD OF THE INVENTION

The invention relates to a concurrent recording and reproducing optical disc and an optical head apparatus for the same, and more particularly, to an optical disc having a programmable and erasable magneto-optical medium film provided on a ROM (Read Only Memory) having rows of pits, and an optical head apparatus for concurrently recording and reproducing information into and from the optical disc.

BACKGROUND OF THE INVENTION

The technology of the optical disc has been rapidly developed and progressed as seen in CD-ROM discs (defined "ROM discs" hereinafter), encodable and erasable magneto-optical discs (defined "RAM (Random Access Memory) discs" hereinafter), etc. At the same time, efforts have been made to expand the utilization field of optical discs in accordance with the hybrid structure of ROM and RAM discs.

In the case where, for instance, image signals which are read from a ROM disc are processed to be written into a RAM disc, or voice is recorded into a RAM disc by a singer who sings a song in accordance with background music reproduced form a ROM disc, there is expected a significant advantage, if the ROM disc and the RAM disc were structured to be a single "ROM and RAM" disc.

For the purpose described above, a conventional recording and reproducing system using a recording and reproducing ROM disc and a two-light beam optical head apparatus has been proposed. One type of recording and reproducing ROM disc comprises a programmable and erasable magneto-optical region provided at an inner peripheral portion of a ROM disc. Another type of recording and reproducing ROM disc comprises a programmable and erasable magneto-optical medium film deposited on a ROM disc having rows of pits in place of an ordinary-deposited Al reflection film.

However, there is a disadvantage in the former type of conventional recording and reproducing ROM in that separate optical head apparatus are needed to be provided to independently reproduce information from rows of the pits and record and reproduce information to and from the magneto-optical region. This disadvantage leads to a complicated structure of the whole system.

In addition, there is a disadvantage in the latter type of conventional recording and reproducing ROM in that the signal light is affected by a polarized light noise caused by light reflected at the rising-up portions of adjacent pits, when a signal is reproduced from the magneto-optical medium film.

SUMMARY OF THE INVENTION

Accordingly, it is an object of the invention to provide a concurrent recording and reproducing optical disc and an optical head apparatus for the same in which the polarization light noise is reduced.

It is another object of the invention to provide a concurrent recording and reproducing optical disc and an optical head apparatus for the same in which a complicated structure is avoided and the necessity of a separate optical head apparatus is eliminated.

According to a feature of the invention, a concurrent recording and reproducing optical disc comprises:

a disc substrate having rows of pits thereon, the rows of pits storing read only memory information; and a magneto-optical medium film deposited on the disc substrate, the magneto-optical medium film storing programmable and erasable information;

wherein the magneto optical medium film is arranged by a predetermined interval between each two adjacent rows of the rows of pits, the predetermined interval being dependent on a diameter of a dark Airy disc circle band of a light beam spot of a focused beam on the magneto-optical medium film.

According to another feature of the invention, an optical head for a concurrent recording and reproducing optical disc, comprises:

a light source for providing two light beams;

means for propagating the two light beams to be focused on the concurrent recording and reproducing optical disc by first and second beam spots, the first beam spot being focused on one of rows of pits provided on the concurrent recording and reproducing optical disc, and the second beam spot being focused on an area between selected two rows of the rows of the pits, the concurrent recording and reproducing disc being coated with a magneto-optical medium film; and means for processing light beams reflected from the concurrent recording and reproducing optical disc in accordance with the first and second beam spots.

BRIEF DESCRIPTION OF THE DRAWINGS

The invention will be explained in more detail in conjunction with appended drawings, wherein.

DESCRIPTION OF THE PREFERRED EMBODIMENTS

Figure 1:
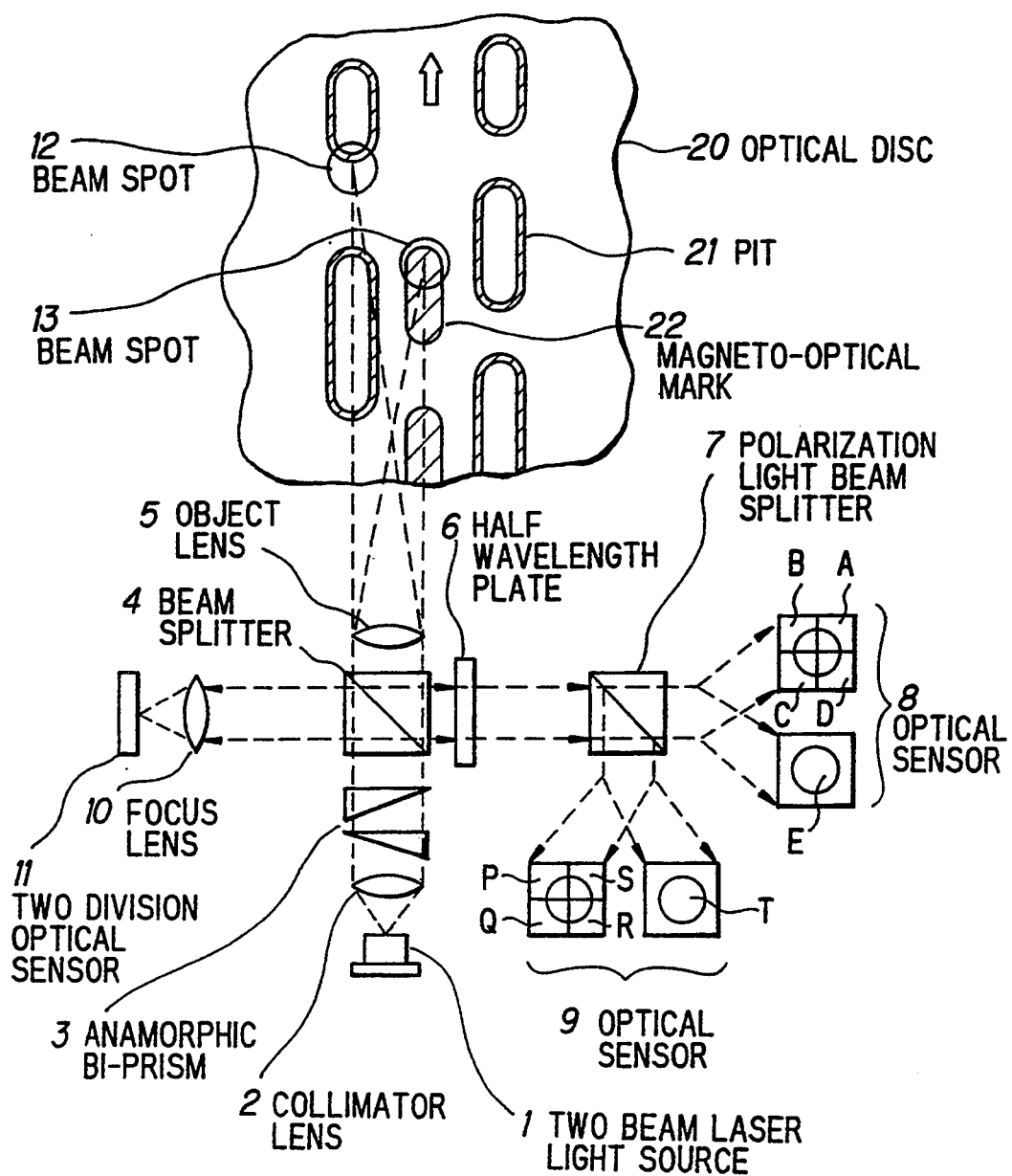
FIG. 1 is an explanatory diagram showing a concurrent recording and reproducing optical disc and an optical head apparatus for the same in a first preferred embodiment according to the invention.

FIG. 1 shows an optical head apparatus for a concurrent recording and reproducing optical disc in the first preferred embodiment according to the invention which comprises a two beam laser light source 1 having two light emitting spots of a distance of 50 $\mu$m for radiating two light beams having a wavelength of 780 nm, a collimator lens 2 for collimating the two light beams, anamorphic bi-prism 3 for shaping the two light beams, a beam splitter 4 for transmitting portions of the two light beams and reflecting the remaining portions of the two light beams in a direction shifted by 90°, an object lens 5 for forming two beam spots 12 and 13 on an optical disc 20, a half wavelength plate 6 for changing the polarization direction of light beams (linearly polarized light) reflected from the optical disc 20 and by the beam splitter 4 by 45°, a polarization light beam splitter 7 for transmitting the light beams and reflecting the light beams in a direction by 90°, an optical sensor 8 having detection regions A, B, C, D and E for detecting the transmitted light beams, an optical sensor 9 having detection regions P, Q, R, S and T for detecting the reflected light beams, a focus lens 10 for focusing the reflected light beams on a predetermined point, and a two division optical sensor 11 for detecting the focused light beams on the predetermined points.

The optical disc 20 is provided with rows of pits 21 and is coated with a magneto-optical medium film stored with magneto-optical marks 22 positioned between each two rows of the pits 21.

In operation, the two laser light beams emitted from the two beam laser light source 1 are collimated by the collimator lens 2, and then shaped by the anamorphic bi-prism 3. Then, parts of the two beams are transmitted through the beam splitter 4, and the remaining parts of the two beams are reflected in the 90°-direction by the beam splitter 4. The transmitted beams are focused on the optical disc 20 to be two beam spots 12 and 13 by the object lens 5.

In this case, the beam spot 12 is adjusted to be positioned on the rows of the pits 21, and the beam spot 13 is adjusted to be positioned on the center region between the rows of the pits 21. That is, ROM information is reproduced from the rows of the pits 21 by the beam spot 12, and RAM information is written in the form of magneto-optical marks 22 to be read by the beam spot 13.

On the other hand, the laser light reflected in the direction of the focus lens 10 by the beam splitter 4 is focused on the two division optical sensor 11, so that the intensity of the two beams is detected by the two division optical sensor 11. Thus, the two beam laser light source 1 is controlled in light power by outputs of the two division optical sensor 11.

The reflected laser lights of the beam spots 12 and 13 focused on the optical disc 20 are again transmitted through the object lens 5, and then reflected in the 90°-direction by the beam splitter 4. The 90°-direction reflected laser light is changed in the linearly polarized direction by 45°, when it is transmitted through the half wavelength plate 6. Thus, the laser light is incident to the polarization light beam splitter 7. The laser light transmitted through the polarization light beam splitter 7 is incident to the optical sensor 8, while the laser light reflected by 90° in the polarization light beam splitter 7 is incident to the optical sensor 9.

In the optical sensors 8 and 9, information from the rows of the pits 21, information from the magneto-optical marks 22, and focus and tracking error signals are obtained by outputs of the detection regions A to E, and those of the detection regions P to T.

Figure 2:
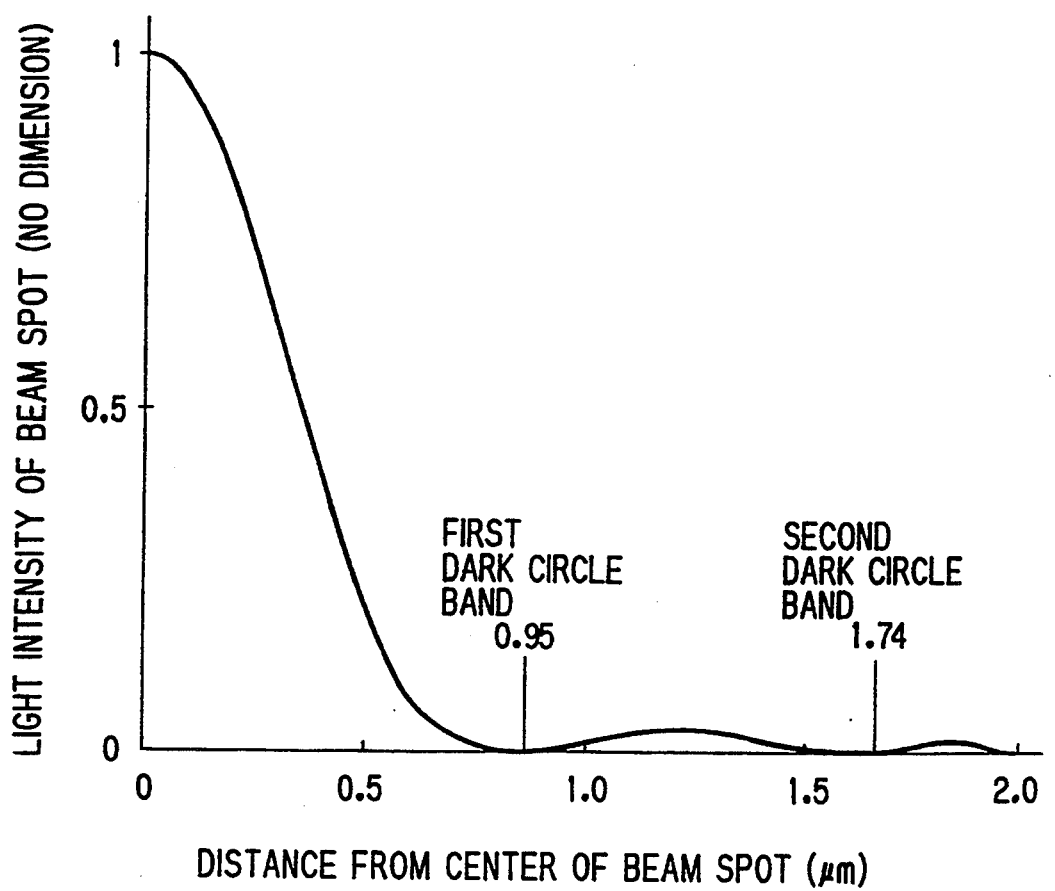
FIG. 2 is a graph showing a beam profile of a beam spot in the first preferred embodiment according to the invention.

In the first preferred embodiment, FIG. 2 shows a beam profile of a beam spot on the optical disc 20, in the case where the numerical aperture (NA) of the object lens 5 is 0.5, and the wavelength of the two laser light beams is 0.78 $\mu$m.

As clearly understood from FIG. 2, the first dark circle band occurs at the distance of 0.95 $\mu$m from the center of the beam spot, and the second dark circle band occurs at the distance of 1.74 $\mu$m therefrom. Accordingly, in the case where a row of pits are arranged on a position of the second dark circle band, polarization light noise generated at the rising-up portions of the pits is largely reduced at the time of the concurrent recording and reproducing of information.

Figure 3:
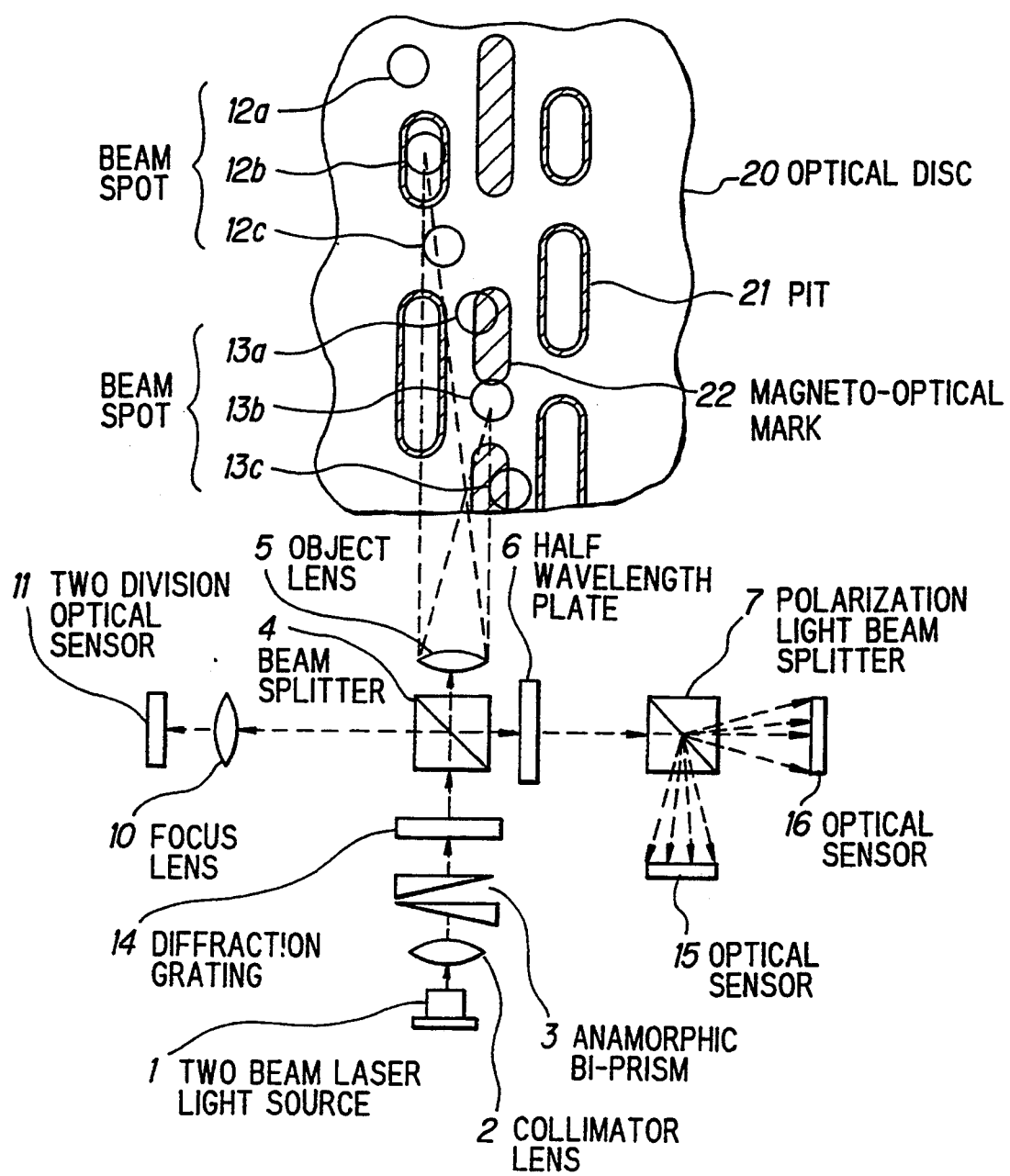
FIG. 3 is an explanatory diagram showing a concurrent recording and reproducing optical disc and an optical head apparatus for the same in a second preferred embodiment according to the invention.

FIG. 3 shows an optical head apparatus for a concurrent recording and reproducing optical disc in the second preferred embodiment according to the invention, wherein like parts are indicated by like reference numerals as used in FIG. 1, and the differences between the first and second preferred embodiments are that a diffraction grating 14 is provided to divide each of the two light beams into three light beams, and optical sensors are indicated by reference numerals 15 and 16.

In operation, the two laser light beams emitted from the two beam laser light source 1 are collimated by the collimator lens 2, and then shaped by the anamorphic bi-prism 3. The two collimated and shaped beams are diffracted to be six beams which are then incident to the beam splitter 4. Thus, six beam spots 12a, 12b and 12c, and 13a, 13b and 13c are obtained on the optical disc 20.

In this case, the beam spots 12a to 12c are adjusted to be positioned on a rows of the pits 21, and the beam spots 13a to 13c are adjusted to be positioned on a region between the two rows of the pits 21. In each group of the beam spots 12a to 12c, and 13a to 13c, the intensity of the beam spots 12a and 12c, and the beam spots 13a and 13c is approximately 1/5 to 1/7 relative to the beam spots 12b and 13b having the intensity of 1.

The laser light beams reflected from the optical disc 20 are again transmitted through the object lens 5, and reflected in the 90°-direction in the beam splitter 4. Then, the 90°-direction reflected lights are supplied via the half wavelength plate 6 and the polarization light beam splitter 7 to the optical sensors 15 and 16, each having seven divisional detection regions, from which outputs are obtained to provide information based on the rows of the pits 21, information based on the magneto-optical marks 22, and focus and tracking error signals.

In the second preferred embodiment, the tracking control is realized with high precision, because each beam supplied from the laser light source is diffracted to be plural light beams. Consequently, the stable recording and reproducing of information are precisely carried out with a transfer rate as high as twice by using a two beam laser light source, even in the case where an optical disc having no pit rows but continuous tracks is used.

In case of a transfer rate as low as approximately 1.5 Mbps as seen in using a compact disc (CD), etc. a magnetic field modulation head may be provided on the opposite side of an optical disc to make it possible that overwrite recording of information is carried out.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching herein set forth.

What is claimed is:

1. A concurrent recording and reproducing optical disc, comprising:
    a disc substrate having rows of pits thereon, said rows of pits storing read only memory information; and
    a magneto-optical medium film deposited on said disc substrate, said magneto-optical medium film storing programmable and erasable information;
    wherein said magneto-optical medium film is arranged by a predetermined interval between each two adjacent rows of said rows of pits, said predetermined interval being dependent on a diameter of a dark Airy disc circle band of a light beam spot focused on said magneto-optical medium film.

2. An optical head apparatus for a concurrent recording and reproducing optical disc, comprising:

a light source for providing two light beams;

means for propagating said two light beams to be focused on the concurrent recording and reproducing optical disc by first and second beam spots, said first beam spot being focused on one of rows of pits provided on said concurrent recording and reproducing optical disc, and said second beam spot being focused on an area between selected two rows of said rows of said pits, said concurrent recording and reproducing disc being coated with a magneto-optical medium film; and means for processing light beams reflected from the concurrent recording and reproducing optical disc in accordance with said first and second beam spots.

3. An optical head apparatus for a concurrent recording and reproducing optical disc, according to claim 2, wherein:

said propagating means comprises a diffraction grating for diffracting said two light beams to be divided as six light beams focused on said concurrent recording and reproducing optical disc.

* * * * *